3,480,240
AIRCRAFT SEAT ASSEMBLY WITH LATERAL
POSITIONING FACILITY
Frank J. Del Giudice, Seattle, Wash., assignor, by mesne
assignments, to Hardman Aerospace, Los Angeles,
Calif., a corporation of California
Filed Mar. 15, 1968, Ser. No. 713,337
Int. Cl. B64d 11/06; B61d 1/04
U.S. Cl. 244—118                                      12 Claims

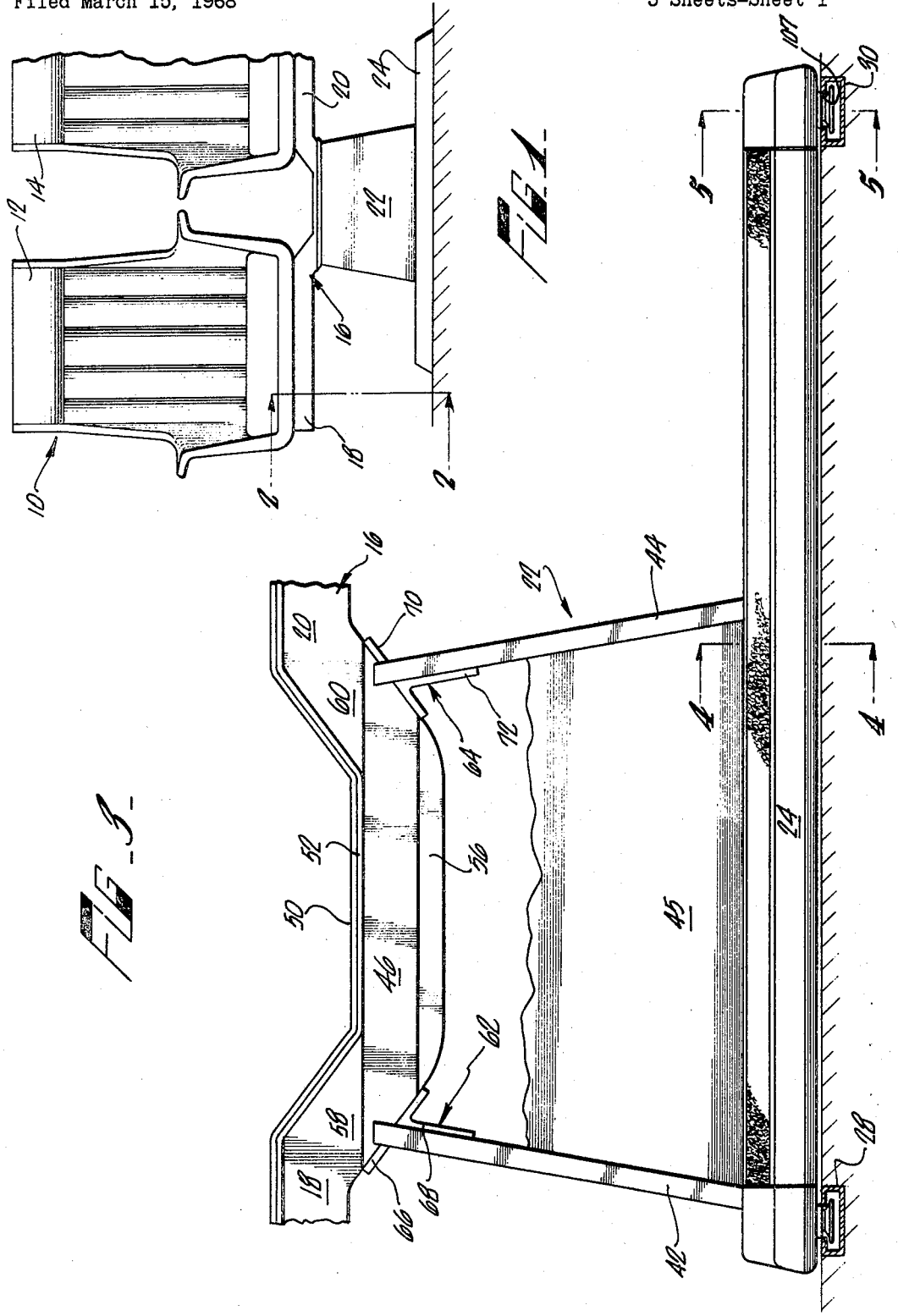

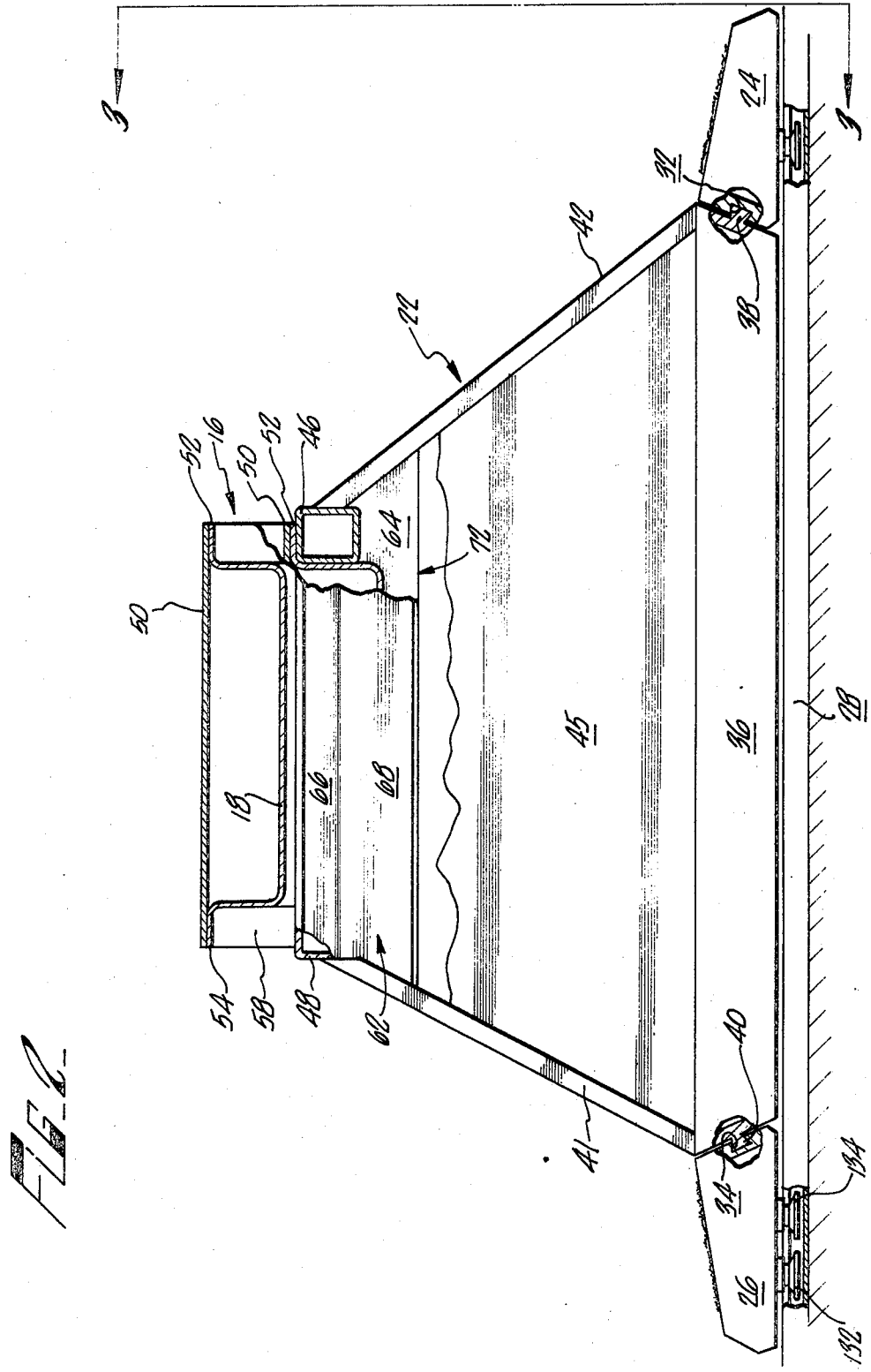

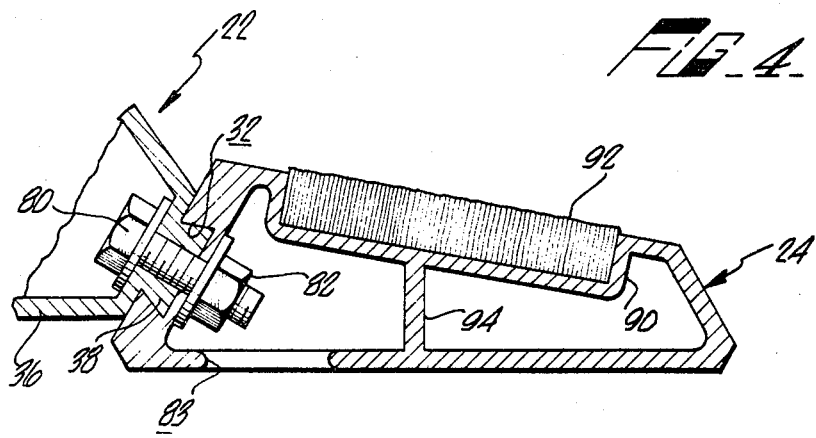
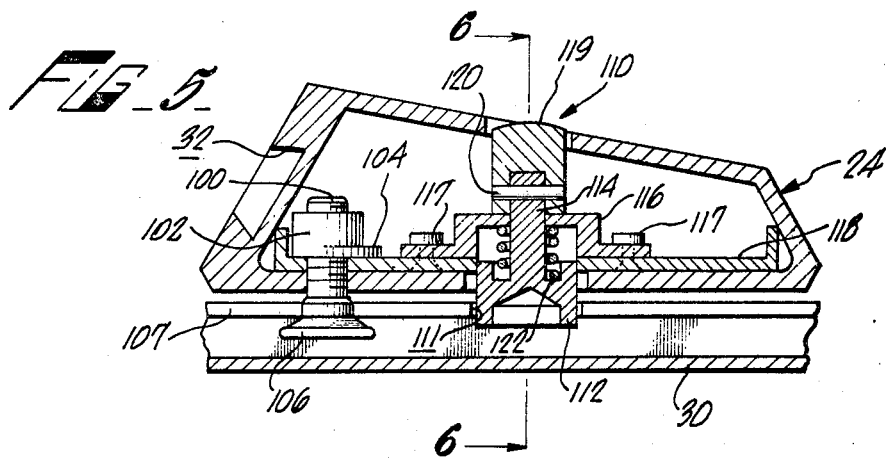
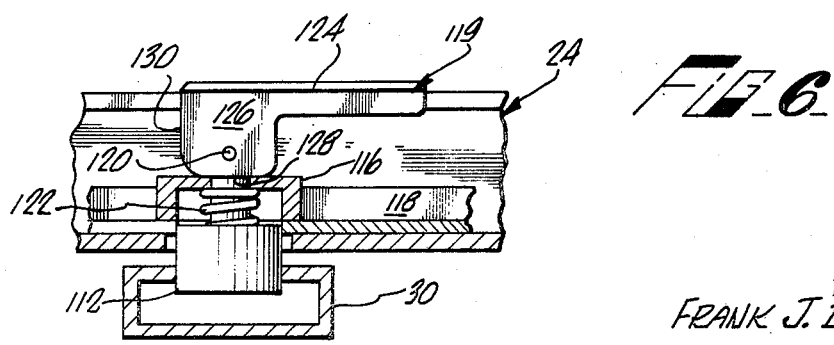

ABSTRACT OF THE DISCLOSURE

A pair of spaced-apart lateral tracks are adapted for mounting to a pair of fore-and-aft seating channels in an aircraft. The base of a laterally positionable pedestal is carried by these lateral tracks. A continuous beam is mounted on the pedestal for the cantilever support of a pair of aircraft seats. The lateral tracks may be positioned as desired in the aircraft's fore-and-aft seating channels and the pedestal moved laterally relative to these channels for desired positioning of the carried aircraft seats relative to the aircraft's interior wall and aisle. After the desired seating position has been obtained, the lateral tracks are locked in place in the fore-and-aft aircraft channels and the pedestal is locked to the lateral tracks.

BACKGROUND OF THE INVENTION

The present invention relates to seating structures for aircraft and, more particularly, to a seating structure which is adapted for fore-and-aft as well as lateral positioning in an aircraft.

The majority of modern day aircraft employs parallel channels to which several tandemly oriented seat assemblies may be secured. The channels not only provide the required mount coupling between the seats and the aircraft, but provide the vehicle for fore-and-aft space variations between seats. In addition, the channels allow for the ready removal and reinstallation of seats necessitated by the conversion and reconversion of an aircraft to a cargo carrier and back into a passenger carrier.

However, many aircraft have interior passenger space configurations which vary dramatically in width along the length of their passenger compartments. These width variations make it extremely difficult to retain the highly desirable seating channels while affording optimum seat spacing both laterally and in the fore-and-aft direction. For example, it is commercially necessary to have the inside seat of each individual seating assembly positioned as closely as possible to a window, a condition which is difficult to achieve with standardized seat assemblies in compartments with width variations and the parallel channels. Even without the problems presented by variations in the width of passenger compartments, it is desirable to have a lateral seat positioning facility to accommodate special seating arrangements.

In sum, with variations in interior width of passenger compartments and with the requirement for fore-and-aft channels for the mounting of several standardized seat assemblies, it is impossible at the present time to provide required lateral seat positioning. Therefore, there is a need for an aircraft seating assembly which is adapted for mounting in parallel fore-and-aft seat channels as well as providing for lateral seat positioning.

SUMMARY OF THE INVENTION

The present invention provides an aircraft seating assembly which may be mounted to parallel fore-and-aft channels in an aircraft's passenger compartment while providing for lateral positioning adjustment to accommodate, for example, different compartment widths.

In one form the present invention includes a pair of spaced-apart lateral tracks which are adapted to be mounted to fore-and-aft channels as by studs. Aircraft seat support means, preferably a pedestal, is carried by these lateral tracks. The seat support means are adapted for lateral positioning on the lateral tracks with respect to the fore-and-aft channels. The lateral positioning facility may be provided by, for example, dovetail or pintle and mortise-type sliding joints between the base of the pedestal and the lateral tracks. The seat support means carry at least two aircraft seats. Means are also provided to securely lock the seating structure against lateral movement as well as fore-and-aft movement when a desired seating position has been obtained. These means may include shear pins carried by the lateral tracks which engage the fore and aft tracks to effect fore-and-aft locking. Lateral locking may be provided simply by bolts between the lateral tracks and the pedestal's base.

Preferably, the pair of aircraft seats are mounted on either side of the pedestal through a seat support beam secured to the pedestal above the lateral tracks. This beam provides cantilever support for the aircraft seats. The seat support beam includes an intermediate portion below the balance of the beam which is cradled between two transverse support beams on the pedestal. Oppositely extending flanges on the seat support beam's intermediate portion may be used to engage the two transverse support beams to augment the support beam's mounting to the pedestal. The pedestal preferably includes four relatively thin legs extending from the base of the pedestal for connection to the transverse support beams. The transverse support beams are securely held together at their ends by, for example, webbing.

If desired, the pedestal may be enclosed to provide an attractive appearance. One side of the pedestal may be left open to accommodate carry-on baggage and the like.

The aircraft seating assembly of the present invention provides a standardized seating structure which may be used with conventional seating channels and yet afford a fore-and-aft lateral positioning facility. This lateral positioning facility may be used to accommodate different aircraft interior space configurations as well as desired seating arrangements. The seating assembly is adapted to be securely locked against fore-and-aft and lateral movement. In its preferred form, the assembly of the present invention utilizes a single horizontal beam to support its carried seats. Cantilever support of the aircraft seats provides for a considerable under-seat storage area, foot room and an attractive appearance. If desired, the beam may be recessed where it meets the pedestal to provide for room for a console, tray storage or the like between adjacent seats.

These and other features, aspects and advantages of the present invention will become more apparent from the following description, appended claims and drawings.

BRIEF DESCRIPTION OF THE FIGURES

FIGURE 1 is a front elevational view of the preferred aircraft seating assembly of the present invention;

FIGURE 2 is a fragmentary view, partly in section, taken along line 2—2 of FIGURE 1, illustrating the seating assembly's pedestal, seat support beam and lateral tracks;

FIGURE 3 is a front elevational view taken along line 3—3 of FIGURE 2;

FIGURE 4 is a view taken along line 4—4 of FIGURE 3 showing the preferred construction of a lateral track as well as the preferred means for providing lateral positioning and locking;

FIGURE 5 is a view taken along line 5—5 of FIGURE 3 illustrating the preferred means for locking the seating structure against fore-and-aft movement; and FIGURE 6 is a fragmentary view taken along line 6—6 of FIGURE 5.

DESCRIPTION OF THE PREFERRED EMBODIMENTS

FIGURE 1 illustrates a preferred form of an aircraft seating assembly 10. In general, the structure includes a pair of aircraft seats 12 and 14 supported by a gull wing, seat support beam 16. Beam 16 has a first cantilever support section 18 for carrying seat 12 and a second cantilever support section 20 for carrying seat 14. A pedestal 22 carries beam 16 and seats 12 and 14. Pedestal 22 is in turn carried by lateral tracks 24 and 26; lateral track 26 is shown in FIGURE 2. These lateral tracks are in turn mounted in a pair of parallel fore-and-aft channels 28 and 30, shown in FIGURE 3. The channels are typically embedded in the floor of an aircraft's passenger compartment and provide the coupling for several tandemly oriented seating assemblies. Through their coupling to fore-and-aft channels 28 and 30, lateral tracks 24 and 26 may be positioned in a fore-and-aft direction. Lateral positioning is afforded by the unique carriage of pedestal 22 on these lateral tracks.

FIGURES 2 and 3 illustrate in greater detail the relationship between gull wing, seat support beam 16, pedestal 22 and lateral tracks 24 and 26. Tracks 24 and 26 are preferably of extruded construction. Each of these tracks has a laterally extending female recess 32 and 34. Pedestal 22 has a base 36. Male slide elements 38 and 40 are integral with base 36 and mate with recesses 32 and 34, respectively. The resulting dovetail or pintle and mortise-type sliding joints effected between base 36 and lateral tracks 24 and 26 enable lateral positioning of the pedestal and its carried seats relative to channels 28 and 30. Four legs extend upwardly from their connection, as by welding, with base 36 for the support of beam 16 and seats 12 and 14. Three of these legs are shown by reference numerals 41, 42 and 44 in FIGURES 2 and 3. The fourth leg is not shown, but is identical to the remaining legs. The legs form the corners of a four-sided frustum with its base at the juncture of the legs with pedestal base 36. Decorative panels 45 may be used between the legs if desired.

A pair of transverse, spaced-apart and parallel support beams 46 and 48 are provided for carrying beam 16. Transverse support beam 46 is attached to legs 42 and 44 for its support above base 36. Leg 41 and its complementary leg (not shown) are attached to transverse support beam 48 for its support. Transverse support beams 46 and 48 are spaced apart to develop a space in which beam 16 is cradled.

Gull wing beam 16 has a cover plate 50 which is attached to a pair of oppositely extending flanges 52 and 54. An intermediate, horizontal section 56 of beam 16 extends parallel to but below cantilever sections 18 and 20. Intermediate section 56 is connected to these cantilever sections by downwardly converging transition sections 58 and 60. Flange 52 in intermediate section 56 of beam 16 rests on the upper surface of support beam 46 as is illustrated in FIGURE 2. Flange 54 is supported by support beam 48 in an identical manner.

The ends of transverse support beams 46 and 48 are angled to conform to the bottom of transition sections 58 and 60. These angled ends are closed by support webs 62 and 64 as seen in FIGURE 2. For this purpose, web 62 includes an angled closing piece 66. A downwardly depending portion 68 of web 62 is secured to closing piece 66 and at its ends to legs 41 and 42. In like manner, web 64 includes angular closing piece 70 and a downwardly depending portion 72. Downwardly depending portion 72 is rigidly secured to leg 44 and its complementary leg (not shown). Thus support webs 62 and 64 together with transverse support beams 46 and 48 provide a rigid frame at the top of pedestal 22. This frame cradles beam 16 by the support provided on flanges 52 and 54 as well as the support provided by closing pieces 66 and 70 on the lower surface of beam transition sections 58 and 60. The gull wing beam is secured to the frame at the top of pedestal 22, as by welding.

The mounting of pedestal 22 and its supported structure to lateral tracks 24 and 26 is best illustrated in FIGURE 4. The construction of the lateral tracks is also shown in this figure. As was previously mentioned, track 24 has a laterally extending recess 32. Pedestal 22 has a male slide element 38. The recess in the track and the slide element mate in a dovetail-type sliding joint. Inasmuch as recess 32 extends for substantially the entire length of lateral track 24, its mating element 38, which may extend for the entire lateral length of base 36, is capable of translating laterally for the extent of the length of track 24. This provides for the lateral positioning accommodation of seating assembly 10. After the desired lateral positioning has been achieved, lateral track 24 and pedestal 22 are rigidly secured together as through fasteners. A typical connection is illustrated in FIGURE 4 wherein a bolt 80 extends from the interior of pedestal 22 through male element 38 into the interior of lateral track 24. To provide for lateral positioning, recess 32 has a plurality of regularly spaced holes along its length to accommodate bolt 80 at a number of locations. A nut 82 is threaded on the end of bolt 80 to secure pedestal 22 to lateral track 24. The bolt may be welded in place for ease in installing nut 82. Access to the nut may be gained through a cutout 83. Alternatively, the nut may be welded in place and access gained through the removal of a decorative panel 45. The connection of pedestal 22 to track 24 is duplicated for track 26 and is made at the four corners of the pedestal's base 36. The dovetail or pintle and mortise-type sliding joint provided by elements 38 and recess 32 is capable of transmitting moment loads from pedestal 22 and its carried weight to lateral track 24 thereby avoiding a stronger coupling between the pedestal and track.

Lateral track 24, as was previously mentioned, is preferably extruded. It includes an upper recess portion 90 which may accommodate carpeting 92. A vertical web 94 connects the bottom of recess 90 to the base of lateral track 24 to increase strength.

With reference to FIGURES 5 and 6, the coupling of lateral tracks 24 and 26 with fore-and-aft channels 28 and 30 is shown. A threaded mounting stud 100 is secured in track 24 through, for example, a nut 102. The nut has a flange 104 for preventing its rotation. Stud 100 has a head 106 which is sized for insertion through regularly spaced holes in channel 30. These regularly spaced holes are connected by a fore-and-aft slot 107 in a well-known manner. The shank of stud 100 is sized for an interference fit with the slot. But the fore-and-aft lock is provided by a locking assembly 110.

Locking assembly 110 includes a shear pin 112 which is sized to fit into one of the holes 111 in channel 30. Shear pin 112 has an upwardly extending shaft 114 that passes into a housing 116. Housing 116 is attached as by rivets 117 to a bearing plate 118. This bearing plate is in turn attached to the interior of the base of lateral track 24. A locking lever 119 is pivotally secured to shaft 114 by a pin 120. A spring 122 bears against the inner upper surface of housing 116 and in an annular recess against shear pin 112. The spring biases the shear pin into its locking position.

As is seen in FIGURE 6, locking lever 119 includes a handle 124 and a cam portion 126. Cam portion 126 includes a bearing surface 128 which bears against the top of housing 116 in the locking position. Cam portion 126 also includes a second bearing portion 130 disposed to act against the top of housing 116 to elevate pin 112 free of its hole in channel 30. Thus, rotation of handle 124 counterclockwise to bring bearing surface 130 against the top of housing 116 lifts pin 112 free from channel 30. Four of these types of locks may be provided at the ends of lateral tracks 24 and 26 to secure the seating structure to channels 28 and 30.

As is standard in aircraft seating structure, the rear of the seating structure is mounted to the fore-and-aft channels by a pair of mounting studs. This is shown in FIGURE 2 by mounting studs 132 and 134.

A typical installation of seating structure 10 will now be described.

The seating structure is initially placed in channels 28 and 30 by passing the heads of the mounting studs through the holes provided in these channels at the approximate fore-and-aft position desired. The seating structure is then moved slightly to place the shanks of the studs in the narrow slots between the access holes in the channels and to register the shear pins of the locking assemblies at the ends of tracks 24 and 26 with mating access holes in the channels (see FIGURE 5). Each of the locking levers 119 of the four locking assemblies is then actuated to insert their shear pins 112 into these access holes. Pedestal 22 is then moved laterally to position seats 12 and 14 in the desired location. When the desired location has been obtained, pedestal 22 is rigidly coupled to lateral tracks 24 and 26 by a plurality of fasteners in a manner illustrated and described with reference to FIGURE 4.

The present invention has been described with reference to certain preferred embodiments.

What is claimed is:

1. An aircraft seating assembly capable of fore-and-aft and lateral positioning comprising:
    (a) a pair of spaced-apart lateral tracks adapted for for mounting in a pair of spaced-apart fore-and-aft channels in an aircraft;
    (b) an aircraft seat support means carried by the lateral tracks for lateral positioning relative thereto;
    (c) at least two spaced-apart aircraft seats carried by the seat support means;
    (d) means to lock the seat support means securely to the lateral tracks; and
    (e) means to lock the lateral tracks securely to the channels.

2. The aircraft seating assembly claimed in claim 1 wherein the seat support means includes:
    (a) a pedestal carried by the lateral tracks; and
    (b) a generally horizontally disposed seat support beam spaced above the lateral tracks and securely carried by the pedestal, the beam providing cantilever support for the aircraft seats.

3. The aircraft seating assembly claimed in claim 2 wherein:
    the seat support beam includes an intermediate horizontal portion disposed below the balance of the beam, the seat support beam being secured to the pedestal at such horizontal portion, the intermediate portion of the seat support beam being between the aircraft seats.

4. The aircraft seating assembly claimed in claim 3 wherein:
    (a) the pedestal has a pair of spaced-apart, transverse support beams at its top; and
    (b) the intermediate portion of the seat support beam is secured to and cradled between the support beams.

5. The aircraft seating assembly claimed in claim 4 wherein each of the lateral tracks is coupled to the pedestal by a pintle and mortise-type sliding joint, the sliding joints being normal to the fore-and-aft channels.

6. The aircraft seating assembly claimed in claim 5 wherein the pedestal includes:
    (a) four legs at its corners rigidly connected to the transverse support beams; and
    (b) a pair of support webs rigidly connecting the ends of the support beams together.

7. The aircraft seating assembly claimed in claim 4 wherein:
    the intermediate portion of the seat support beam includes oppositely extending horizontal flanges at its top, the flanges being carried by the transverse support beams.

8. The aircraft seating assembly claimed in claim 7 wherein the pedestal includes:
    (a) four legs at its corners rigidly connected to the transverse support beams; and
    (b) a pair of support webs rigidly connecting the ends of the support beams together.

9. The aircraft seating assembly claimed in claim 8 wherein each of the lateral tracks is coupled to the pedestal by a pintle and mortise-type sliding joint, the sliding joints being normal to the fore-and-aft channels.

10. An aircraft seating assembly capable of fore-and-aft and lateral positioning comprising:
    (a) a pair of spaced-apart lateral tracks adapted for mounting in a pair of spaced-apart fore-and-aft channels in an aircraft;
    (b) a pedestal carried by the lateral tracks for lateral positioning relative thereto;
    (c) two spaced-apart aircraft seats;
    (d) means on the pedestal for providing cantilever support for each of the aircraft seats above the lateral tracks with one of the aircraft seats to each side of the pedestal;
    (e) means to lock the pedestal securely to the lateral tracks; and
    (f) means to lock the lateral tracks to the channels.

11. The aircraft seating assembly claimed in claim 10 wherein the cantilever support means includes:
    a generally horizontally disposed seat support beam spaced above the lateral tracks, extending to either side of the pedestal, and securely carried by the pedestal, the aircraft seats being secured to the beam on either side of the pedestal.

12. The aircraft seating assembly claimed in claim 11 wherein:
    the seat support beam includes an intermediate horizontal portion disposed below the balance of the beam, the seat support beam being secured to the pedestal at such horizontal portion.

References Cited

UNITED STATES PATENTS

| | | | |
|---|---|---|---|
| 2,332,841 | 10/1943 | Burton et al. | 105—344 X |
| 3,142,461 | 7/1964 | Naylor | 244—137 |
| 3,419,164 | 12/1968 | O'Neill | 244—137 X |

MILTON BUCHLER, Primary Examiner

T. W. BUCKMAN, Assistant Examiner

U.S. Cl. X.R.

52—9; 105—345